US011118249B1

(12) United States Patent
Burtch

(10) Patent No.: US 11,118,249 B1
(45) Date of Patent: Sep. 14, 2021

(54) METHOD FOR TUNING THERMAL EXPANSION PROPERTIES IN AN ADDITIVE MANUFACTURING FEEDSTOCK MATERIAL

(71) Applicant: National Technology & Engineering Solutions of Sandia, LLC, Albuquerque, NM (US)

(72) Inventor: Nicholas C. Burtch, Oakland, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 935 days.

(21) Appl. No.: 15/717,265

(22) Filed: Sep. 27, 2017

(51) Int. Cl.
| | | |
|---|---|---|
| *C22C 32/00* | (2006.01) | |
| *B33Y 10/00* | (2015.01) | |
| *B33Y 70/00* | (2020.01) | |
| *B29C 64/10* | (2017.01) | |
| *B33Y 70/10* | (2020.01) | |
| *C22C 1/05* | (2006.01) | |
| *B22F 10/00* | (2021.01) | |
| *B28B 1/00* | (2006.01) | |

(52) U.S. Cl.
CPC .......... *C22C 32/0094* (2013.01); *B22F 10/00* (2021.01); *B28B 1/001* (2013.01); *B29C 64/10* (2017.08); *B33Y 10/00* (2014.12); *B33Y 70/00* (2014.12); *B33Y 70/10* (2020.01); *C22C 1/05* (2013.01)

(58) Field of Classification Search
None
See application file for complete search history.

(56) References Cited

U.S. PATENT DOCUMENTS

2017/0050376 A1* 2/2017 Casellas ................ B33Y 80/00

OTHER PUBLICATIONS

DeCoste, Stability and degradation mechanisms of metal-organic frameworks containing the Zr6O4(OH)4 secondary building unit, Journal of Materials Chemistry A, (Year: 2013).*
Omnexus, Coefficient of Linear Thermal Expansion, (Year: 2015).*
Wang, Three-dimensional Printed Acrylonitrile Butadiene Styrene Framework Coated with Cu-BTC Metal-organic Frameworks for the Removal of Methylene Blue, Scientific Reports, (Year: 2014).*

(Continued)

*Primary Examiner* — Anthony J Zimmer
*Assistant Examiner* — Michael J Kachmarik
(74) *Attorney, Agent, or Firm* — Medley, Behrens & Lewis, LLC

(57) ABSTRACT

A feedstock material for use in an additive manufacturing apparatus is prepared from a first material and a metal organic framework (MOF). The MOF comprises a plurality of nodes and a plurality of linkers, the plurality of linkers coupled to the plurality of nodes, thereby forming a framework. The MOF has a lower coefficient of thermal expansion than a coefficient of thermal expansion for the first material. As a result, the feedstock material has a reduced coefficient of thermal expansion as compared to the first material alone and thus exhibits low thermal expansion as its temperature is increased. The coefficient of thermal expansion for the MOF may be modified by using a different plurality of nodes and/or a different plurality of linkers, as well as by incorporating guest molecules or atoms into the framework of the MOF.

11 Claims, 6 Drawing Sheets

Increasing ligand length

(56) References Cited

OTHER PUBLICATIONS

Balestra, Controlling Thermal Expansion: A Metal-Organic Frameworks Route, Chemistry of Materials, (Year: 2016).*

Zhou, Three-dimensional Printing for Catalytic Applications: Current Status and Perspectives, Advanced Functional Materials, (Year: 2017).*

Balestra, et al., "Controlling Thermal Expansion: A Metal-Organic Frameworks Route", In Chemistry of Materials, vol. 28, 2016, pp. 8296-8304.

Burtch, et al., "Investigating Water and Framework Dynamics in Pillared MOFs", In Molecular Simulation, vol. 41, Nos. 16-17, May 13, 2015, pp. 1379-1387.

Chun, et al., "Discovery, Synthesis, and Characterization of an Isomeric Coordination Polymer with Pillared Kagome Net Topology", In Inorganic Chemistry, vol. 46, No. 11, 2007, pp. 4371-4373.

Dubbeldam, et al., "Exceptional Negative Thermal Expansion in Isoreticular Metal-Organic Frameworks", In Angewandte Chemie Int. Ed., vol. 46, 2007, pp. 4496-4499.

Furukawa, et al., "The Chemistry and Applications of Metal-Organic Frameworks", In Science, vol. 341, Aug. 30, 2013, 101 pages.

Han, et al., "Metal-Organic Frameworks Provide Large Negative Thermal Expansion Behavior", In Journal of Physical Chemistry C, vol. 111, Oct. 3, 2007, pp. 15185-15191.

Jasuja, et al., "Adjusting the Stability of Metal-Organic Frameworks Under Humid Conditions by Ligand Functionalization", In Langmuir, vol. 28, No. 49, 2012, pp. 16874-16880.

Jasuja, et al., "Kinetic Water Stability of an Isostructural Family of Zinc-Based Pillared Metal-Organic Frameworks", In Langmuir, vol. 29, No. 2, 2013, pp. 633-642.

Katz, et al., "A facile synthesis of UiO-66, UiO-67 and their derivatives", In Chemical Communication, vol. 82, 2013, pp. 9449-9451.

Kaye, et al., "Impact of Preparation and Handling on the Hydrogen Storage Properties of Zn4O(1,4-benzenedicarboxylate)3 (MOF-5)", In Journal of American Chemical Society, vol. 129, No. 46, 2007, pp. 14176-14177.

Mary, et al., "Negative Thermal Expansion from 0.3 to 1050 Kelvin in ZrW2O8", In Science, vol. 272, Apr. 5, 1996, pp. 90-92.

Rijnaarts, et al., "Metal-Organic Frameworks (MOFs) as Multivalent Materials: Size Control and Surface Functionalization by Monovalent Capping Ligands", In Chemistry a European Journal, vol. 21, 2015, pp. 10296-10301.

Shearer, et al., "Defect Engineering: Tuning the Porosity and Composition of the Metal-Organic Framework UiO-66 via Modulated Synthesis", In Chemistry of Materials, vol. 28, No. 11, 2016, pp. 3749-3761.

Tan, et al., "Stability and Hydrolyzation of Metal Organic Frameworks with Paddle-Wheel SBUs upon Hydration", In Chemistry of Materials, vol. 24, No. 16, 2012, pp. 3153-3167.

Tovar, et al., "Diffusion of CO2 in Large Crystals of Cu-BTC MOF", In Journal of American Chemical Society, vol. 138, No. 36, 2016, pp. 11449-11452.

* cited by examiner

METHOD FOR TUNING THERMAL EXPANSION PROPERTIES IN AN ADDITIVE MANUFACTURING FEEDSTOCK MATERIAL

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

FIELD

This disclosure relates to tailoring thermal expansion of materials used in additive manufacturing processes.

BACKGROUND

Additive manufacturing is a category of manufacturing techniques that produces three-dimensional objects layer-by-layer. Each layer is generally thin, such as between 10 to 100 μm. Additive manufacturing is a useful technology because it offers design flexibility not available to traditional machining approaches, and is empowered by software that can contribute to unique properties of additively manufactured parts. For example, the composition and geometry of each layer can be stored in a computer file. An additive manufacturing apparatus can deposit materials in accordance with each layer stored in the computer file so as to form the three-dimensional object. Objects produced via additive manufacturing often produce less waste material and can be manufactured using less energy than traditional manufacturing techniques.

Conventionally, most materials utilized in additive manufacturing exhibit positive thermal expansion (PTE), that is, most materials expand as temperature is increased. Problems can arise when a three-dimensional object constructed with a PTE material is exposed to changes in temperature. For instance, critical junctions of the three-dimensional object may expand and warp in the presence of heat, potentially decreasing functionality of the three-dimensional object. Furthermore, positive thermal expansion can cause significant stress or material failure in applications where the three-dimensional object is placed in a confined environment. At material interfaces in composite materials, mismatches in coefficients of thermal expansion for two materials can cause adhesion problems, including cracking and peeling behaviors.

SUMMARY

A method of additive manufacturing includes selecting a first material having a positive coefficient of thermal expansion and a metal organic framework (MOF) having a coefficient of thermal expansion less than the coefficient of thermal expansion for the first material. For instance, the MOF may have a negative coefficient of thermal expansion. The MOF comprises a plurality of nodes coupled to a plurality of linkers, thereby forming a framework. The MOF is then combined with the first material so as to provide a feedstock material with a coefficient of thermal expansion that is less than the coefficient of thermal expansion of the first material. A three-dimensional object is then formed layer-by-layer using the feedstock material. As the feedstock material has a lower coefficient of thermal expansion than the first material, the three-dimensional object exhibits lower thermal expansion properties than a three-dimensional object formed solely from the first material.

In an embodiment disclosed herein, a feedstock material for use in an additive manufacturing apparatus comprises a first material having a positive coefficient of thermal expansion and a MOF having a coefficient of thermal expansion less than the coefficient of thermal expansion for the first material. For instance, when the coefficient of thermal expansion for the MOF is negative, the absolute value of the coefficient of thermal expansion for the first material can be within 10% of an absolute value of the coefficient of thermal expansion for the MOF such that the feedstock material exhibits low thermal expansion characteristics as compared to the first material by itself.

A method for providing a MOF additive to a first material includes the steps of a) selecting a target coefficient of thermal expansion that is selected to be less than a coefficient of thermal expansion of the first material; b) providing the MOF additive; c) obtaining a coefficient of thermal expansion for the MOF additive by performing x-ray diffraction, interferometry, thermomechanical analysis, and/or dilatometry on the MOF additive; d) repeating steps (b) and (c), if necessary, with different MOF additives until a suitable MOF additive with a coefficient of thermal expansion within a threshold range from the target coefficient of thermal expansion is found; and e) combining the first material and the MOF additive to form a composite material. Step (d) can also include incorporating different guest molecules into the framework of the MOF additive.

The above description presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later

DETAILED DESCRIPTION

Figure 1:
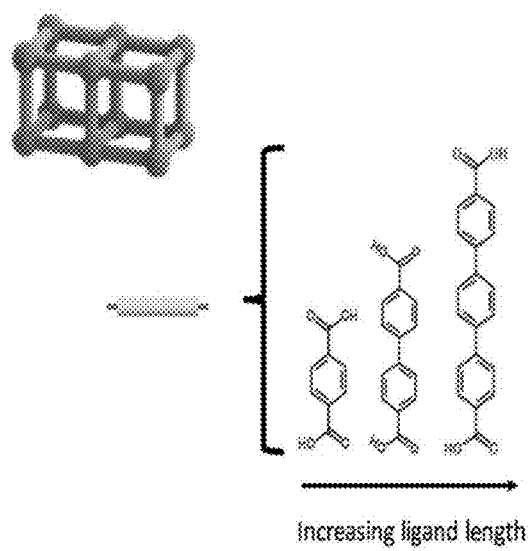
FIG. 1 is a depiction of a group of linkers of varying length.

Certain materials exhibit negative thermal expansion (NTE) as a temperature of the material is varied within a certain temperature range. Rather than expanding, NTE materials contract as temperature is increased. NTE materials can be combined with PTE materials to form composite materials such that changes in the dimensions of the composite material in the presence of changing temperatures are minimal. Certain metal organic frameworks (MOFs) exhibit NTE. MOFs are crystalline materials with a nanoporous structure comprising metal atoms connected by organic ligands (referred to as linkers). Their tailorable porosity and surface chemistry, ease of synthesis, and ultra-high surface areas, combined with a broad choice of building blocks, make them useful as a NTE material.

Disclosed herein are methods for additive manufacturing using a feedstock material comprising a first material and a metal organic framework (MOF). The MOF comprises a plurality of nodes and a plurality of linkers. The plurality of linkers are coupled to the plurality of nodes, thereby forming a porous framework. In an embodiment, a coefficient of thermal expansion for the first material may be positive and a coefficient of thermal expansion for the MOF may be less than the coefficient of thermal expansion for the first material. More specifically, the coefficient of thermal expansion for the MOF may be 5 to 350% lower than the coefficient of thermal expansion for the first material. For instance, the coefficient of thermal expansion for the MOF may be 10 to 15%, 15 to 50%, or 20 to 25% lower than the coefficient of thermal expansion for the first material. In an embodiment, the coefficient of thermal expansion for the MOF may be negative. In an embodiment, the feedstock material thus exhibits low thermal expansion as a temperature of the feedstock material increases as the (lower) coefficient of thermal expansion for the MOF offsets (either partially or fully) the positive coefficient of thermal expansion for the first material. Also disclosed herein is a method of additive manufacturing using the aforementioned feedstock material. Further disclosed herein is a method for providing a MOF additive to a first material to form a composite material, wherein the MOF additive is tailored to have a target coefficient of thermal expansion chosen to cause the composite material to have a coefficient of thermal expansion less than the coefficient of thermal expansion of the first material.

The term nanoporous includes materials having pore sizes of 0.2 to 1000 nm. In embodiments, the pore diameters may range from 1 nm to 200 nm, such as for example, 2 to 50 nm (subcategorized as mesoporous), or pore diameters of less than 2 nm, such 0.2 to 2 nm (subcategorized as microporous). Pore diameters may be determined using the Barrett-Joyner-Halenda (BJH) size distribution determination method or from the Brunauer-Emmet-Teller (BET) method using nitrogen isotherm measurements.

As used herein, the term "coefficient of thermal expansion" refers to a linear coefficient of thermal expansion, unless otherwise noted to be in only two (area coefficient of thermal expansion) or three (volume coefficient of thermal expansion) dimensions. As used in the claims, the coefficient of thermal expansion should be determined by thermomechanical analysis as detailed in ASTM E831-14 "Standard Test Method for Linear Thermal Expansion of Solid Materials by Thermomechanical Analysis."

As mentioned above, the feedstock material comprises a first material and a MOF. The first material may be a material which is well suited for use in additive manufacturing. More specifically, the first material may be a material which is well suited for use in metal additive manufacturing or plastic-based additive manufacturing. For example, for metal additive manufacturing, the first material may be selected from the group consisting of: scandium, titanium, chromium, manganese, iron, cobalt, nickel, copper, zinc, silver, palladium, rhodium, gold, platinum, osmium iridium, molybdenum, tungsten, tantalum, aluminum, tin, lead, bismuth, gold, lithium, silicon, and combinations thereof. For plastic-based additive manufacturing, the first material may be selected from the group consisting of: acrylonitrile butadiene styrene, polylactic acid, polyvinyl alcohol, polycarbonate, and combinations thereof. The first material may also be selected from the group consisting of: curable photopolymer systems, thermoplastic systems, ceramics, polymers/resins, waxes, and combinations thereof.

It is contemplated that the first material will have a positive coefficient of thermal expansion, meaning that the first material will expand upon the application of heat. Thus, the first material may have a coefficient of thermal expansion ranging from 2 to 300 parts per million (ppm) $K^{-1}$. For example, the first material can have a coefficient of thermal expansion ranging from 5 to 295 ppm $K^{-1}$, from 50 to 200 ppm $K^{-1}$, or from 150 to 175 ppm $K^{-1}$.

As mentioned previously, the MOF comprises a plurality of nodes and a plurality of linkers, the plurality of nodes coupled to the plurality of linkers, thereby forming a framework. Each node in the plurality of nodes may comprise a metal atom selected from the group consisting of: aluminum, magnesium, manganese, silver, cadmium, lanthanum, nickel, zinc, chromium, indium, gallium, copper, iron, molybdenum, cobalt, ruthenium, hafnium, and zirconium. The metal atom may also be coordinated with other atoms (such as oxygen or nitrogen) and/or functional groups. For instance, each node in the plurality of nodes may be selected from the group consisting of: $Zn_4O(CO_2)_8$, $Zn_4O(CO_2)_6$, $Zn_3O(CO_2)_6$, $Cr_3O(CO_2)_6$, $In_3O(CO_2)_6$, $Ga_3O(CO_2)_6$, $Cu_2(CO_2)_4$, $Zn_2(CO_2)_4$, $Fe_2(CO_2)_4$, $Mo_2(CO_2)_4$, $Cr_2(CO_2)_4$, $Co_2(CO_2)_4$, $Ru_2(CO_2)_4$, $Zr_6O_4(OH)_4$, $Zr_6O_4(OH)_4(CO_2)_{12}$, and $Zr_6O_8(CO_2)_8$.

Different node compositions may positively or negatively affect the coefficient of thermal expansion for the MOF. Thus, the coefficient of thermal expansion for the MOF may be selectively modified by changing the composition of each node in the plurality of nodes for the MOF. Without being bound by theory, it is believed that nodes comprising more than one metal atom are more likely to exhibit negative thermal expansion characteristics.

In general, a linker in the plurality of linkers can be an aromatic molecule containing one or more carboxylate groups. For instance, the plurality of linkers can include a linker selected from the group consisting of: benzene-1,3,5-tricarboxylic acid ($H_3BTC$), 2,4,6-tris(4-carboxyphenyl)-s-triazine ($H_3TATB$), 4,4',4"(1,3,3a¹,4,6,7,9-heptaazaphenalene-2,5,8-tryl)tribenzoic acid ($H_3HTB$), triphenylene-2,6,10-tricarboxylic acid ($H_3TTCA$), 1,3,5-tris(4-carboxyphenyl)benzene ($H_3BTB$), 4,4',4"-((1,3,5-triazine-2,4,6-triyl)tris(azanediyl))tribenzoic acid ($H_3TATAB$), 1,3,5-triscarboxyphenylethynylbenzene ($H_3BTE$), 2,4,6-tris(3,5-dicarboxylphenylamino)-1,3,5-triazine ($H_6TDPAT$), N,N',N"-tris(isophthalyl)-1,3,5-benzenetricarboxamide ($H_6TPBTM$), 1,3,5-tris(4'-carboxy[1,1'-biphenyl]-4-yl)benzene ($H_3BBC$), 5,5',5"-benzene-1,3,5-triyltris(1-ethynyl-2-isophthalic acid) ($H_6BTEI$), 1,3,5-benzenetriphosphonic acid ($H_6BTPI$), 5,5'-((5'-(4-((3,5-dicarboxyphenyl)ethynyl)phenyl)-[1,1':3',1"-terphenyl]-4,4"-diyl)-bis(ethyne-2,1-diyl))diisophthalic acid ($H_6PTEI$), 5,5',5"-(benzene-1,3,5-triyltris(buta-1,3-diyne-4,1-diyl))triisophathalic acid ($H_6BHEI$), 5,5',5"-(4,4',4"-nitrilotris(benzene-4,1-diyl)tris(ethyne-2,1-diyl))triisophthalate ($H_6NTEI$), 5,5',5"-(4,4',4"-(benzene-1,3,5-triyl)tris(1H-1,2,3-triazole-4,1-diyl))triisophthalic acid ($H_6BTTI$), 5',5"",5""""-(benzene-1,3,5-triyltris(ethyne-2,1-diyl))tris(((1,1':3',1"-tarphenyl]-4,4"-dicarboxylate)) ($H_6BTETCA$), adipic acid (ADP), 5,5',5"-(((benzene-1,3,5-triyl-tris(ethyne-2,1-diyl))tris(benzene-4,1-diyl))tris(ethyne-2,1-diyl))triisophthalate ($H_6TTEI$), 5,5',5"-(((benzene-1,3,5-triyl-tris(ethyne-2,1-diyl))tris(benzene-4,1-diyl-tris(buta-1,3-diyne-4,1-diyl))triisophthalate (H₆BNETPI), tri(4-imidazolylphenyl)amine (TIPA), 5,5',5"-(((((benzene-1,3,5-triyltris(benzene-4,1-diyl)tris(ethyne-2,1-diyl))-tris(benzene-4,1-diyl))tris(ethyne-2,1-diyl))triisophthalate (H₆BHEHPI), 4,5,9,10-tetrahydropyrene-2,7-dicarboxylic acid (H₂TPDC), tetra(p-carboxyphenyl) porphyrin (H₄TpCPP-H₂), 5,5'-(anthracene-9,10-diyl) diisophthalic acid (H₄ADIP), tetrathiafulvalene tetrabenzoic acid (H₄TTFTB), 4,4',4"-(benzene-1,3,5-triyl)tris(pyrazol-1-ide) (H₃BTP), 1,3,5-tri(1H-1,2,3-triazol-5-yl)benzene (H₃BTTri), 5,5',5"-(1,3,5-phenylene)tris(1H-tetrazole) (H₃BTT), biphenyl-4,4'-dicarboxylate (BPDC), 4',4''',4'''',4'''''-(pyrene-1,3,6,8-tetrayl) tetrakis(2',5'-dimethyl-[1,1'-biphenyl]-4carboxylate (Py-XP), meso-tetrakis-(4-carboxylatebiphenyl)-porphyrin (Por-PP), 4,4',4''',4''''-((pyrene-1,3,6,8-tetrayltetrakis(benzene-4,1-diyl))tetrakis(ethyne-2,1-diyl))tetrabenzoate (Py-PTP), meso-tetrakis-(4-((phenyl) ethynyl)benzoate)porphyrin (Por-PTP), terephthalic acid, 2-5-dimethylterephtalic acid, 9,10-anthracenedicarboxylic acid, 2,3,5,6 tetramethylterephthalic acid, 1,4-napthalenedicarboxylic acid, biphenyl-4,4'-dicarboxylate, triethylenediamine, 1,4-benzenedicarboxylate, and combinations thereof. Chemical structures of some of the aforementioned linkers are depicted in H. Furukawa, et al., "Supplementary Materials for The Chemistry and Applications of Metal-Organic Frameworks," *Science*, Aug. 30, 2013, 341, pages 3-5, which is herein incorporated by reference.

In an embodiment, the MOF will have cubic crystal symmetry; however, other crystal systems are possible. For instance, the MOF crystal may have a tetragonal, hexagonal, rhombohedral, orthorhombic, monoclinic, or triclinic symmetry. Furthermore, in an embodiment, the MOF will be isotropic, that is, as the temperature of the MOF increases, expansion/contraction will be experienced equally along dimensions of the MOF. However, the MOF may also be anisotropic, that is, as the temperature of the MOF increases, expansion/contraction may not be experienced equally along the dimensions of the MOF.

Without being bound by theory, it is believed that longer linkers lead to a decreased coefficient of thermal expansion for a MOF (i.e., an increased magnitude of negative thermal expansion). For example, FIG. 1 depicts a group of similar molecules (terephthalic acid, biphenyl-4,4'-dicarboxylate, and p-terphenyl-4-4"-dicarboxylic acid) that differ in the number of aromatic rings in the molecule (1, 2, and 3, respectively). As p-terphenyl-4-4"-dicarboxylic acid is the "longest" molecule in the group, it will lead to a more negative coefficient of thermal expansion when used in the MOF than the next "longest" molecule, biphenyl-4,4'-dicarboxylate. Biphenyl-4,4'-dicarboxylate will likewise lead to a more negative coefficient of thermal expansion when used in the MOF than the shortest molecule in the group, terephthalic acid. Thus, the coefficient of thermal expansion for the MOF may be made more negative by incorporating "longer" linkers into the MOF, and the coefficient of thermal expansion for the MOF may be made more positive by incorporating "shorter" linkers into the MOF.

Figure 2:
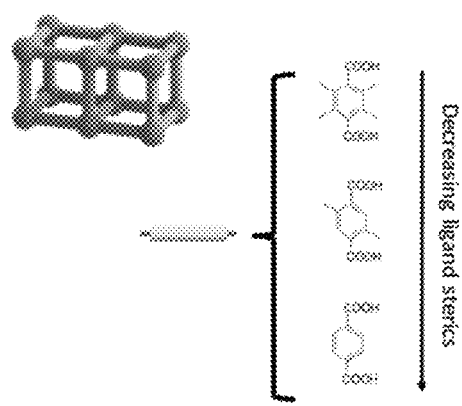
FIG. 2 is a depiction of a group of linkers having a varying number of methyl groups.

Furthermore, without being bound by the theory, it is believed that linkers with increased sterics (i.e., linkers with more and/or bulkier (e.g., branched or cyclic) functional groups) cause the MOF to have a more positive coefficient of thermal expansion by interfering with vibrational modes of the MOF that are responsible for NTE. For example, FIG. 2 depicts a group of similar molecules (terephthalic acid, 2,5-dimethylterephthalic acid, and 2,3,5,6-tetramethylterephthalic acid) that differ in the number of methyl groups (0, 2, and 4, respectively). As 2,3,5,6-tetramethylterephthalic acid has the most methyl groups in the group of molecules, it will cause the MOF to have a more positive coefficient of thermal expansion when used as a linker than the molecule with the next largest number of methyl groups, 2,5-dimethylterephthalic acid. 2,5-dimethylterephthalic acid will likewise cause the MOF to have a more positive coefficient of thermal expansion than terephthalic acid as terephthalic acid does not contain methyl groups. Thus, the coefficient of thermal expansion for the MOF may be made more negative by incorporating linkers with decreased sterics (i.e., linkers with a lower number of functional groups) into the MOF, and the coefficient of thermal expansion for the MOF may be made more positive by incorporating linkers with increased sterics (i.e., linkers with a higher number of functional groups) into the MOF.

Additionally, the MOF may comprise more than one type of linker. For example, the plurality of linkers may comprise a first linker group and a second linker group. The first linker group may be oriented along a first axis of the MOF, while the second linker group may be oriented along a second axis of the MOF. Thermal expansion properties of the first linker group and the second linker group may vary such that upon application of heat, the MOF may contract along the first axis, but expand along the second axis.

Figure 3:
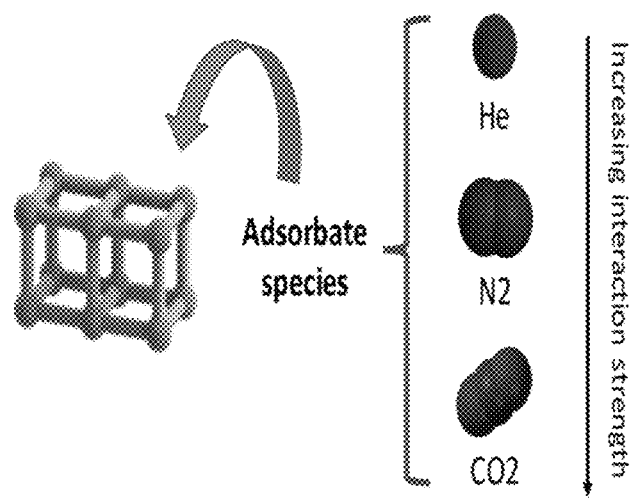
FIG. 3 is a depiction of a group of guest molecules/atoms of varying interaction strength.

The coefficient of thermal expansion of the feedstock material may be further modulated by incorporating a guest molecule or atom into the framework of the MOF. For example, the guest molecule or atom may be a gas molecule or atom, the gas molecule or atom selected from the group consisting of: $CO_2$, $N_2$, Ar, He, Ne, Kr, $H_2O$, $O_2$, and Xe. Without being bound by theory, it is believed that guest molecules or atoms with less interaction strength increase the magnitude of negative thermal expansion for the MOF. For example, FIG. 3 depicts a group of guest molecules or atoms: He, $N_2$, and $CO_2$. As is known by those skilled in the art, He has less interaction strength than $N_2$, and $N_2$ has less interaction strength than $CO_2$. Since He has the lowest interaction strength of the group, incorporating it into the framework of the MOF will cause the MOF to have a lower coefficient of thermal expansion than incorporating $N_2$. Likewise, incorporating $N_2$ into the framework of the MOF will cause the MOF to have a lower coefficient of thermal expansion than incorporating $CO_2$. Accordingly, the coefficient of thermal expansion of the MOF may be decreased by incorporating guest molecules or atoms with lower interaction strength in the framework of the MOF, and increased by incorporating guest molecules or atoms with higher interaction strength into the framework of the MOF.

Without being bound by theory, it is believed that the presence of crystallographic defects in the MOF framework can negatively or positively influence the coefficient of thermal expansion for the MOF. Thus, utilizing MOFs with crystallographic defects can further aid in adjusting the coefficient of thermal expansion for the MOF It is understood that negative thermal expansion properties of a MOF may only be exhibited within a certain temperature range. When a temperature of the MOF increases or decreases beyond the temperature range, it may no longer exhibit negative thermal expansion. The MOF may exhibit negative thermal expansion in a temperature range of 60 to 600 K, above which framework decomposition may occur and result in loss of MOF order and porosity. For example, the MOF may exhibit negative thermal expansion in a temperature range of 70 to 500 K, 200 to 400 K, or 300 to 350 K.

The MOF may have a coefficient of thermal expansion ranging from −50 to 50 ppm $K^{-1}$. For example, the MOF can have a coefficient of thermal expansion ranging from −45 to 40 ppm K$^{-1}$, from −30 to 20 ppm K$^{-1}$, or from −20 to −5 ppm K$^{-1}$.

The ratio of the first material to the MOF may range from 0.5:0.5 to 0.995:0.005. For instance, the ratio of the first material to the MOF may range from 0.6:0.4 to 0.99:0.01, from 0.75:0.25 to 0.9:0.1, or from 0.8:0.2 to 0.85:0.15.

As mentioned above, the coefficient of thermal expansion for the feedstock material is less than the coefficient of thermal expansion for the first material due to the presence of the MOF. The coefficient of thermal expansion for the feedstock material may be 0.1 to 200 ppm K$^{-1}$ less than the coefficient of thermal expansion for the first material. For example, the coefficient of thermal expansion for the feedstock material may be 0.5 to 150 ppm K$^{-1}$, 5 to 100 ppm K$^{-1}$, or 110 to 140 ppm K$^{-1}$ less than the coefficient of thermal expansion for the first material.

The MOF may then be combined with the first material in order to form the feedstock material. The feedstock material may then be used in an additive manufacturing apparatus. For instance, the additive manufacturing apparatus may be an additive manufacturing apparatus sold by FormLabs or Stratsys. For example, the feedstock material may be used in an additive manufacturing apparatus designed for material jetting, binder jetting, VAT photopolymerization (stereolithography), sheet lamination, material extrusion, directed energy deposition, or powder bed fusion. Hybrid approaches are also contemplated. In general, the additive manufacturing apparatus forms a three-dimensional object layer-by-layer. Depending on the particular technique of additive manufacturing, it is understood that the feedstock material may undergo irreversible chemical changes during the process of additive manufacturing. As such, the coefficient of thermal expansion for the feedstock material prior to its use in the additive manufacturing apparatus may vary from the coefficient of thermal expansion for the feedstock material after the feedstock material has been incorporated into the three-dimensional object. Accordingly, the coefficient of thermal expansion for the feedstock material may be selected to account for thermal expansion properties that are exhibited after the three-dimensional object has been generated.

In an embodiment, the additive manufacturing apparatus positions the feedstock material on a substrate surface. The additive manufacturing apparatus then applies an energy pulse to at least a portion of the feedstock material on the substrate, thereby forming a first layer of the three-dimensional object. Additional feedstock material is then positioned over at least a portion of the first layer. The additive manufacturing apparatus then applies another energy pulse to the feedstock material positioned over the at least a portion of the first layer, thereby forming a second layer of the three-dimensional object. The additive manufacturing apparatus repeats this process for a plurality of layers of the three-dimensional object, thereby forming the finished three-dimensional object.

A method for selecting a MOF additive that can be added to a first material is now described. In step (a), a target coefficient of thermal expansion is selected. In an embodiment, the target coefficient of thermal expansion may be negative. The target coefficient of thermal expansion is selected to be less than a coefficient of thermal expansion of the first material. The target coefficient of thermal expansion may, for example, range from −50 to 50 ppm K$^{-1}$. For instance, the target coefficient of thermal expansion may range from −45 to −40 ppm K$^{-1}$, −30 to 20 ppm K$^{-1}$, or from −10 to 5 ppm K$^{-1}$. In step (b), a MOF additive is provided. The MOF additive comprises a plurality of nodes and a plurality of linkers, the plurality of nodes coupled to the plurality of linkers, thereby forming a framework. The nodes in the MOF additive may comprise one of the nodes listed above and the linkers in the MOF additive may comprise one or more of the linkers listed above.

In step (c), a coefficient of thermal expansion for the MOF additive is obtained using thermomechanical analysis. A thin layer of the MOF additive ranging from 0.1 to 1.0 mm is placed on a surface of the thermomechanical analysis unit. The temperature within the unit is then increased over a temperature range of 100 to 600 K, depending on the MOF stability limits. It is contemplated that the temperature range is chosen to reflect an operating temperature of a product produced using the first material. Changes in the dimensions of the MOF additive are then measured at certain intervals. For example, changes in the dimensions of the MOF additive may be measured every 0.1 K, every 1 K, every 5 K, every 20 K, or every 50 K. It is contemplated that the temperature range is chosen to reflect an operating temperature of a product produced using the first material.

The coefficient of thermal expansion for the MOF additive may also be obtained by performing x-ray diffraction on the MOF additive or in an embodiment a pre-determined value is looked-up. A sample of the MOF additive is loaded into a capillary tube. The capillary tube is then sealed with wax to prevent moisture from entering the capillary tube. The capillary tube is then placed in an x-ray diffractometer. The temperature within the x-ray diffractometer is then increased over a temperature range of 100 to 600 K and x-ray diffraction scans of the MOF additive are taken at certain intervals. For example, the temperature range may range from 150 to 550 K, from 200 to 500 K, or from 300 to 400 K and x-ray diffraction scans may be taken every 0.1 K, every 1 K, every 5 K, every 20 K, or every 50 K. It is contemplated that the temperature range is chosen to reflect an operating temperature of a product produced using the first material. The x-ray diffraction scans are then used in a refinement approach based on a crystallographic model in order to quantify thermal expansion/contraction of the MOF additive (i.e. the coefficient of thermal expansion). Suitable refinement approaches include Rietveld refinement, Pawley refinement, and Le Bail refinement. Other methods of quantifying thermal expansion/contraction (beyond those described above) are also contemplated. For instance, the thermal expansion/contraction can be characterized using dilatometry and/or interferometry.

Additionally, quantification of thermal expansion/contraction can also be achieved through use of quantum mechanical software packages such as the Vienna Ab initio Simulation Package (VASP) or Gaussian. As discussed above, it is believed that "longer" linkers impart a greater degree of negative thermal expansion to the MOF additive. Quantum mechanical software packages may be employed to calculate an increase in energy of a linker (relative to the most favorable, equilibrium 0 K configuration of the linker) upon compression. A lower energetic penalty for the compression indicates that the linker is likely to impart a greater degree of negative thermal expansion. The increase in energy of the linker may then be used to predict which linkers would cause the MOF to have the target coefficient of thermal expansion. Alternatively, if the periodic MOF structure including the intended nodes and ligands is considered, the thermal expansion properties of the intended MOF can be predicted using techniques such as NPT ensemble (constant number of particles, pressure, and temperature) molecular simulations.

In step (d), steps (b) and (c) are repeated, if necessary, with different linkers and/or nodes until the coefficient of thermal expansion for a suitable MOF additive is within a threshold range from the target coefficient of thermal expansion. The threshold range may range from 1 to 20% from the target coefficient of thermal expansion. For example, the threshold range may range from 2 to 18%, from 5 to 15%, or from 8 to 10% from the target coefficient of thermal expansion. Additionally, as discussed previously, guest molecules or atoms, such as gas molecules or atoms or solvents, may be incorporated into the framework of the MOF additive in order to further adjust the coefficient of thermal expansion for the MOF additive. The incorporation of the guest molecules or atoms may occur via adsorption. As stated above, it is believed that less strongly interacting gas molecules increase the magnitude of negative thermal expansion, whereas more strongly interacting gas molecules decrease the magnitude of negative thermal expansion. In step (e), the suitable MOF additive is combined with the first material to form a composite material. As the coefficient of thermal expansion for the suitable MOF additive is less than the coefficient of thermal expansion for the first material, the coefficient of thermal expansion for the composite material may be 0.1 to 200 ppm $K^{-1}$ less than the coefficient of thermal expansion for the first material. For example, the coefficient of thermal expansion for the composite material may be 0.5 to 140 ppm $K^{-1}$, 5 to 100 ppm $K^{-1}$, or 110 to 140 ppm $K^{-1}$ less than the coefficient of thermal expansion for the first material.

Although the above-described method has been described as including steps (a)-(e) in alphabetic order, it is understood that in some embodiments the order of steps (a)-(e) may vary. For instance, in an embodiment, step (b) may be performed before step (a).

The above-described approach may also be modified to account for characteristics of the MOF in addition to the coefficient of thermal expansion. For example, when the first material is to be used in electronic manufacturing, a MOF additive that can adhere to dielectric layers in an integrated circuit is desirable (in addition to the thermal expansion properties described above). In order to impart adhesion properties to the MOF additive, the linkers of the MOF additive may be post-synthetically functionalized with amine groups. Monodentate carboxylate ligands may also be useful in imparting adhesion properties to the MOF additive. Additionally, a hydrophobic MOF additive may also be desirable when the material is to be used in electronic manufacturing. For instance, the linkers may be fluorinated and/or may be functionalized to include alkyl groups in order to increase the hydrophobicity of the MOF additive. The MOF additive may also be incorporated into an insulating material in an electronic device, such as in dielectric layers for electronic potting applications or for integrated circuit packaging.

EXAMPLES

The following section describes several example MOFs that demonstrate tunable thermal expansion properties. These MOFs can be combined with another material to form a feedstock material, which can then be used in an additive manufacturing apparatus to generate a three-dimensional object. These examples also indicate utility for use in materials in making conductive, semi-conductive, and insulating parts of electronic components, such as microchips and circuit boards.

Example MOFs 1-5

To demonstrate the effects of different linkers on the coefficient of thermal expansion, Example MOFs 1-5 were prepared. Example MOF 1 was prepared according to the procedures detailed in K. Tan, et al., "Stability and Hydrolyzation of Metal Organic Frameworks with Paddle-Wheel SBUs upon Hydration," *Chem. Mater.*, 2012, 24 (16), 3153-3167, which is incorporated herein by reference.

Example MOF 2 was prepared according to the procedures detailed in H. Jasuja, et al., "Adjusting the Stability of Metal-Organic Frameworks under Humid conditions by Ligand Functionalization," *Langmuir*, 2012, 28 (49), 16874-16880, which is herein incorporated by reference.

Example MOFs 3-5 were prepared according to the procedures detailed in H. Jasuja, et al., "Kinetic Water Stability of an Isostructural Family of Zinc-Based Pillared Metal-Organic Frameworks," *Langmuir*, 2013, 29 (2), 633-642, which is herein incorporated by reference.

Example MOFs 1-5 had tetragonal crystal symmetry. The components of Examples MOFs 1-5 are summarized in Table 1.

TABLE 1

| Example | Metal in Nodes | Linkers along first axis | Linkers along second and third axis |
|---|---|---|---|
| 1 | Zn | triethylenediamine | terephthalic acid |
| 2 | Zn | triethylenediamine | 2,5-dimethylterephthalic acid |
| 3 | Zn | triethylenediamine | 2,3,5,6-tetramethylterephthalic acid |
| 4 | Zn | triethylenediamine | 1,4-napthalenedicarboxylic acid |
| 5 | Zn | triethylenediamine | 9,10-anthracenedicarboxylic acid |

After synthesis, Example MOFs 1-5 were subjected to heating and vacuum in order to remove residual solvent molecules from their pore space. The resulting Example MOFs were solvent-less and in polycrystalline powder form. Each Example MOF was loaded into a capillary tube of diameter 0.7 mm inside of a glovebox. The end of each capillary tube was sealed with wax to prevent moisture from entering the Example MOFs. Each capillary tube was then placed in an x-ray diffractometer. The temperature within the x-ray diffractometer was varied in steps of 10 K starting at 290 K and ending at 400 K using cold nitrogen. After each step, an x-ray diffraction scan was taken of each of Example MOFs 1-5. From the scan, the size of the lattice parameters at a given temperature were quantified using a Le Bail refinement approach based on a crystallographic model.

Figure 4:
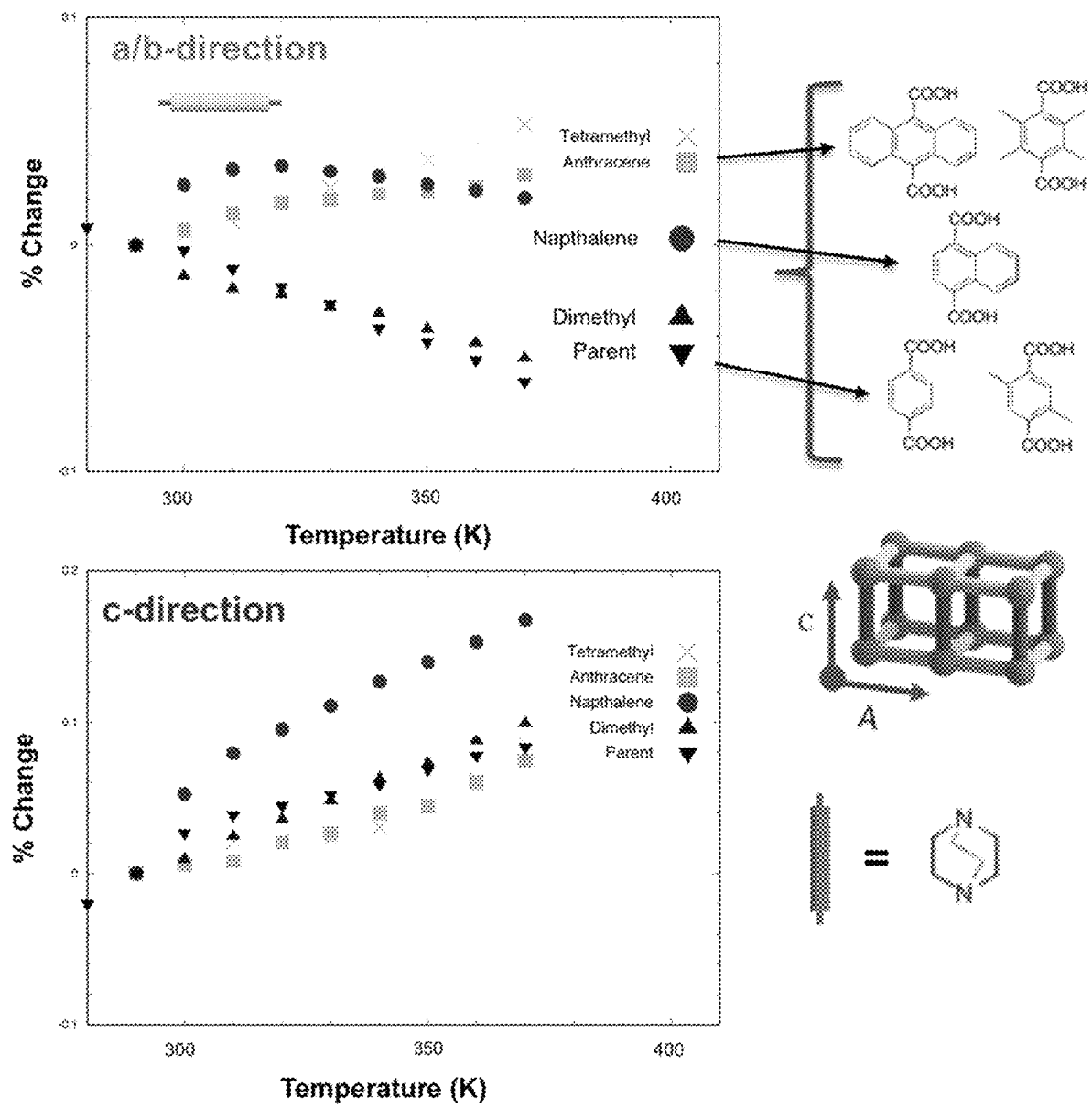
FIG. 4 shows two plots of a percent change in MOF lattice parameters vs. temperature for MOFs with different linker composition.

Two plots, shown in FIG. 4, were then generated based on the results of the refinement approach: one showing percent change in MOF dimensions along a first axis (referred to as c-direction in FIG. 4) vs. temperature and one showing percent change in MOF dimensions along a second axis and a third axis (referred to as a/b-direction in FIG. 4) vs. temperature. Example MOFs 1-5 demonstrated positive thermal expansion in the c-direction, with Example MOF 4 demonstrating the greatest thermal expansion in the c-direction. Example MOFs 3-5 demonstrated positive thermal expansion in the a/b direction; however, Example MOFs 1-2 demonstrated negative thermal expansion along the a/b direction. More specifically, Example MOFs 1-2 contracted along the a/b-direction by approximately 0.06 to 0.08% as the temperature was increased from 290 to 370 K.

Example MOFs 6-9

To demonstrate the effects of different nodes on the coefficient of thermal expansion, Example MOFs 6-9 were prepared. Example MOFs 6-9 were synthesized according to the procedures detailed in the publican by K. Tan, et al., referenced above. Example MOFs 6-9 had tetragonal crystal symmetry. The components of Example MOFs 6-9 are shown in Table 2.

TABLE 2

| Example | Metal in Nodes | Linkers along first axis | Linkers along second and third axis |
| --- | --- | --- | --- |
| 6 | Zn | triethylenediamine | terephthalic acid |
| 7 | Cu | triethylenediamine | terephthalic acid |
| 8 | Co | triethylenediamine | terephthalic acid |
| 9 | Ni | triethylenediamine | terephthalic acid |

Figure 5:
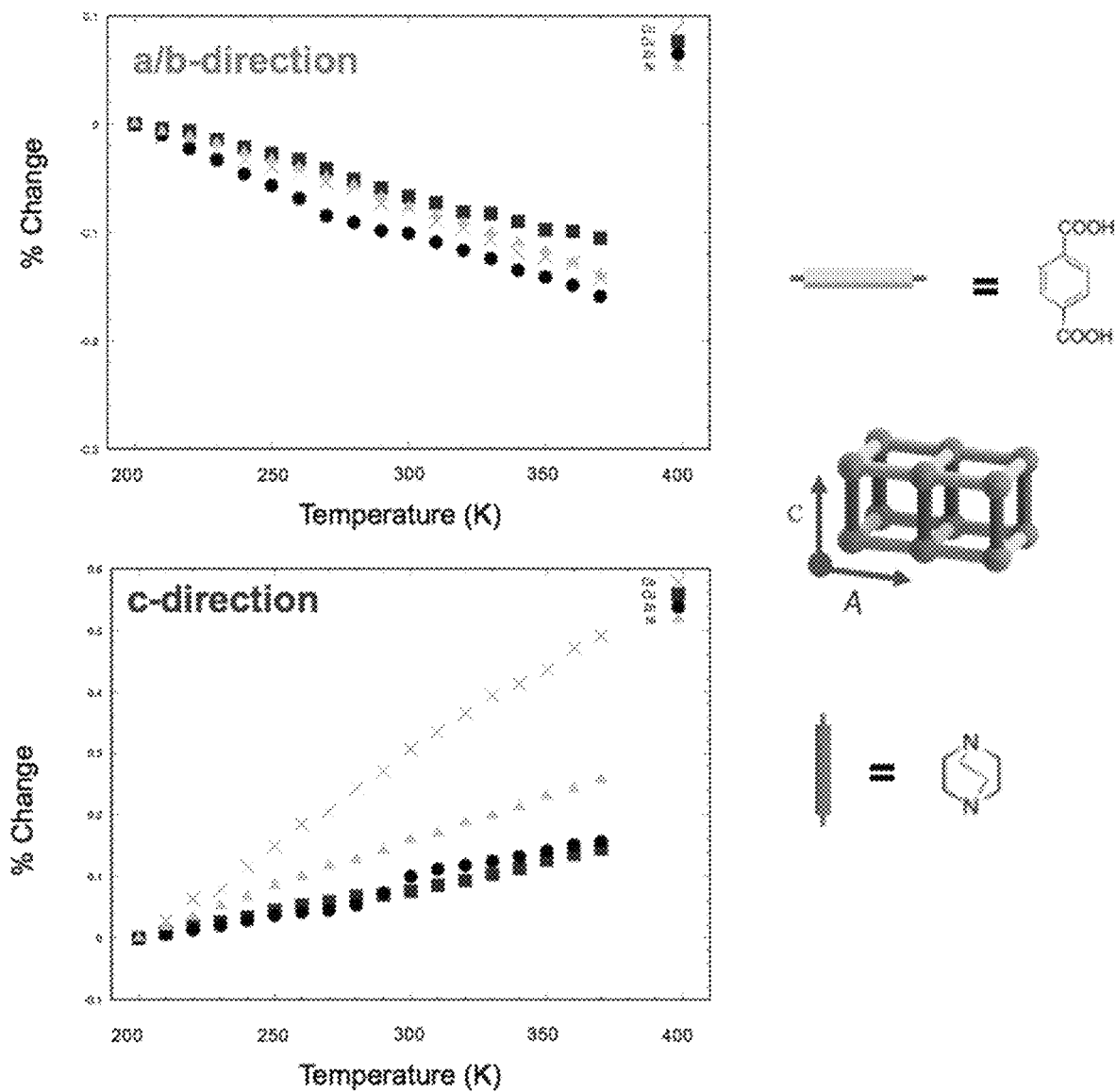
FIG. 5 shows two plots of a percent change in MOF lattice parameters vs. temperature for MOFs with different node composition.

After synthesis, Example MOFs 6-9 were subjected to a procedure similar to the procedure described above for Example MOFs 1-5; however, for Example MOFs 6-9, the thermal expansion/contraction was measured over a range of 200 to 370 K, in 10 K steps. Two plots, shown in FIG. 5, were then generated based on the results of the refinement approach: One showing percent change in MOF dimensions along a first axis (referred to as c-direction in FIG. 5) vs. temperature and one showing percent change in MOF dimensions along a second axis and a third axis (referred to as a/b-direction in FIG. 5) vs. temperature. Example MOFs 6-9 showed positive thermal expansion in the c-direction, with Example MOF 8 exhibiting the greatest thermal expansion. Example MOFs 6-9 showed negative thermal expansion in the a/b-direction. More specifically, Example MOFs 6-9 contracted along the a/b-direction by approximately 0.1 to 0.14% as the temperature was increased from 200 to 370 K.

Example MOFs 10-11

To demonstrate the effects of guest molecules on the coefficient of thermal expansion for a MOF, Example MOFs 10-11 were prepared according to the procedures detailed in S. Kaye, et al., "Impact of Preparation and Handling on the Hydrogen Storage Properties of $Zn_4O(1,4$-benzenedicarboxylate$)_3$ (MOF-5)," $J. Am. Chem. Soc.$, 2007, 129 (46), 14176-14177, which is herein incorporated by reference. The components of Example MOFs 10-11 are shown in Table 3.

TABLE 3

| Example | Nodes | Linkers | Guest Molecule |
| --- | --- | --- | --- |
| 10 | $Zn_4O$ | terephthalic acid | He |
| 11 | $Zn_4O$ | terephthalic acid | $CO_2$ |

After synthesis, Example MOFs 10-11 were subjected to a procedure similar to the procedure described above for Example MOFs 6-9; however, for Example MOFs 10-11, the thermal expansion/contraction was measured over a temperature range of 240 to 370 K, in 10 K steps. Example MOF 10 demonstrated 0.50% volume contraction over the temperature range, while Example MOF 11 demonstrated 0.49% volume contraction over the temperature range. This indicates that fine-tuning of thermal expansion properties of a material is possible with this method.

Example MOFs 12-13

To demonstrate the effects of linker "length" or structure on the coefficient of thermal expansion, Example MOFs 12-13 were prepared. Example MOF 12 was a UiO-66 type MOF. "UiO" is an abbreviation of Universitetet i Oslo (University of Oslo) and is used by those skilled in the art to designate certain MOF structures. Example MOF 12 was prepared according to the procedures detailed in G. Shearer, et al., "Defect Engineering: Tuning the Porosity and Composition of the Metal-Organic Framework UiO-66 via Modulated Synthesis," $Chem. Mater.$, 2016, 28 (11), 3749-3761, which is herein incorporated by reference. Example MOF 13 was a UiO-67 type MOF. Example MOF 13 was prepared according to the procedures detailed in M. Katz, "A facile synthesis of UiO-66, UiO-67 and their derivatives," $Chem. Commun.$, 2013, 82, 9449-9451, which is herein incorporated by reference. Example MOFs 12-13 were isotropic. The components of Example MOFs 12-13 are shown in Table 4.

TABLE 4

| Example | Nodes | Linkers |
| --- | --- | --- |
| 12 | $Zr_6O_4(OH)_4$ | terephthalic acid |
| 13 | $Zr_6O_4(OH)_4$ | biphenyl-4,4'-dicarboxylate |

After synthesis, Example MOFs 12-13 were subjected to a procedure similar to the procedure described above for Example MOFs 6-9; however, for Example MOFs 12-13, the thermal expansion/contraction was measured over a temperature range of 260 to 370 K, in 10 K steps. Example MOF 12 demonstrated 0.17% volume contraction over the temperature range. Example MOF 13 demonstrated 0.18% volume contraction over the temperature range.

Example MOF 14

Figure 6:
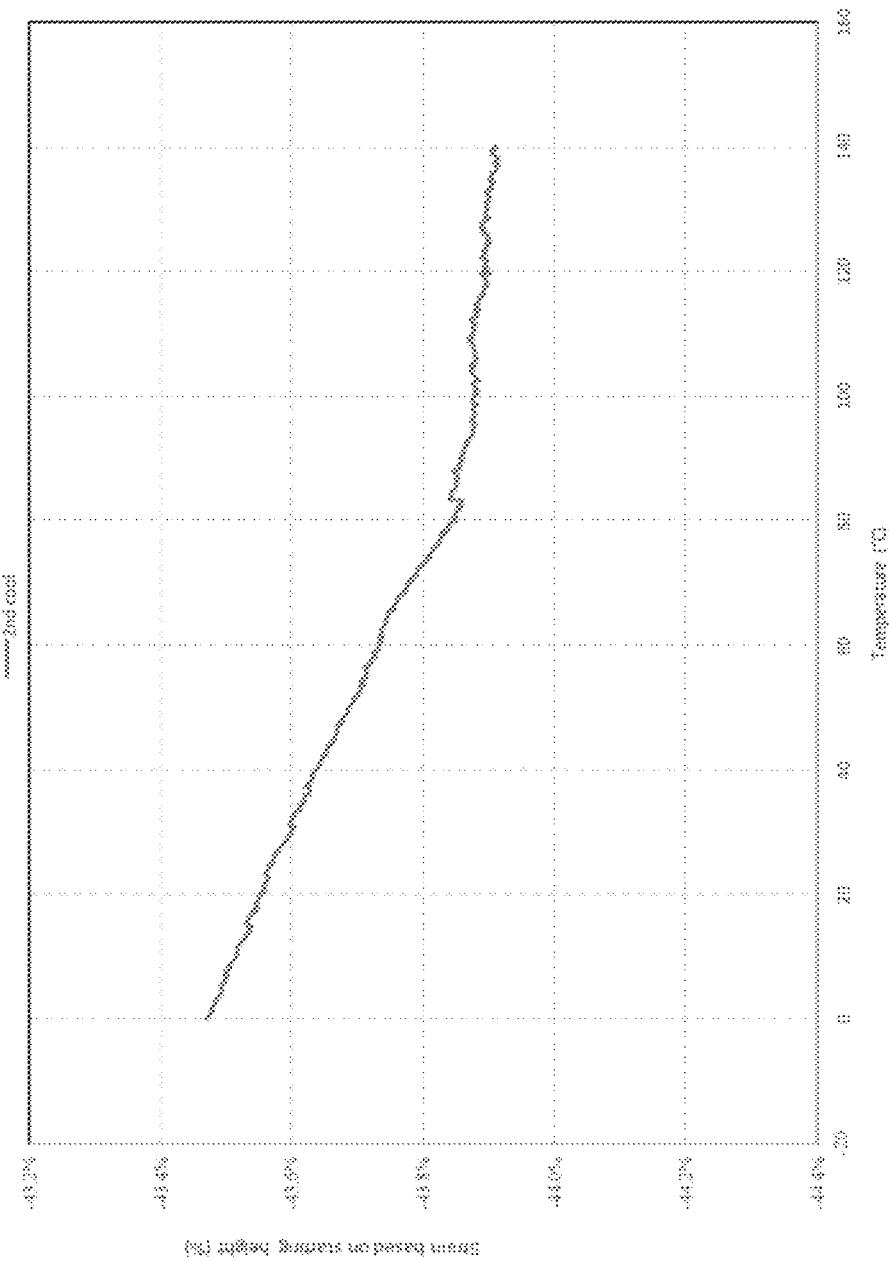
FIG. 6 shows a plot demonstrating thermomechanical analysis results.

To demonstrate negative thermal expansion at the bulk or particle level, thermomechanical analysis was performed on Example MOF 14 over a temperature range of 0 to 140° C. Example MOF 14 had Cu-based nodes and benzene-1,3,5-tricarboxylic acid as linkers and was synthesized according to the procedures detailed in T. Tova, et al., "Diffusion of $CO_2$ in Large Crystals of Cu-BTC MOF," $J. Am. Chem. Soc.$, 2016, 138 (36) 11449-11452, which is herein incorporated by reference. After synthesis, a 0.25 mm layer of Example MOF 14 was placed on a flat surface of a TMA Q400 thermomechanical analysis unit. A first heating and cooling cycle was then performed to account for annealing of Example MOF 14. A second heating and cooling cycle was then performed and the change in the bulk or particle dimensions of Example MOF 14 were tracked as the temperature of Example MOF 14 was increased at a rate of 1° C./min. A plot, shown in FIG. 6, demonstrating the percent strain based on starting height vs temperature was generated. As seen in FIG. 6, Example MOF 14 demonstrated negative thermal expansion over the temperature range. More specifically, the percentage strain based on starting height reduced from approximately −43.5% at 0° C. to −43.9% at 140° C.

Not all embodiments disclosed herein must possess the characteristics discussed above. Furthermore, the claims are not to be limited by any such characteristics discussed herein unless recited in the claim itself.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent the term "includes" is used in either the detailed description or the claims, such term is intended to be inclusive in a manner similar to the term "comprising" as "comprising" is interpreted when employed as a transition word in a claim. The term "consisting essentially" as used herein means the specific materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A feedstock material for use in an additive manufacturing apparatus, the feedstock material comprising:
   a first material, wherein a coefficient of thermal expansion for the first material is positive; and
   a metal organic framework (MOF), wherein the MOF comprises a plurality of nodes and a plurality of linkers, the plurality of nodes coupled to the plurality of linkers, thereby forming a framework;
   wherein a ratio of the first material to the MOF by weight ranges from 0.5:0.5 to 0.995:0.005;
   wherein the feedstock material is a composite material;
   wherein, the coefficient of thermal expansion for the MOF is 10% to 25% lower than the coefficient of thermal expansion for the first material.

2. The feedstock material of claim 1, wherein the first material is selected from the group consisting of: acrylonitrile butadiene styrene, polylactic acid, polyvinyl alcohol, polycarbonate, and combinations thereof.

3. The feedstock material of claim 1, wherein each node in the plurality of nodes comprises an atom selected from the group consisting of: aluminum, magnesium, manganese, silver, cadmium, lanthanum, nickel, zinc, chromium, indium, gallium, copper, iron, molybdenum, cobalt, ruthenium, hafnium, and zirconium.

4. The feedstock material of claim 1, wherein the plurality of linkers includes one or more linkers selected from the group consisting of: $H_3BTC$, $H_3TATB$, $H_3HTB$, $H_3TTCA$, $H_3BTB$, $H_3TATAB$, $H_3BTE$, $H_6TDPAT$, $H_6TPBTM$, $H_3BBC$, $H_6BTEI$, $H_6BTPI$, $H_6PTEI$, $H_6BHEI$, $H_5NTEI$, $H_6BTTI$, $H_6BTETCA$, adipic acid, $H_6TTEI$, $H_6BNETPI$, TIPA, $H_6BHEPI$, $H_2TPDC$, $H_4TpCPP-H_2$, $H_4ADIP$, $H_4TTFTB$, $H_3BTP$, $H_3BTTri$, $H_3BTT$, BPD, BPDC, Py-XP, Por-PP, Py-PTP, Por-PTP, 2-5-dimethylterephtalic acid, 9,10-anthracenedicarboxylic acid, 2,3,5,6 tetramethylterephthalic acid, 1,4-napthalenedicarboxylic acid, biphenyl-4,4'-dicarboxylate, p-terphenyl-4,4"-dicarboxylic acid, triethylenediamine, 1,4-benzenedicarboxylate, and combinations thereof.

5. The feedstock material of claim 1, wherein a ratio of the first material to the MOF by weight ranges from 0.6:0.4 to 0.99:0.01.

6. The feedstock material of claim 1, wherein the coefficient of thermal expansion for the feedstock material is 0.1 to 200 ppm $K^{-1}$ less than the coefficient of expansion of the first material.

7. The feedstock material of claim 1, wherein the MOF has a guest molecule or atom incorporated into the framework, the guest molecule or atom selected from the group consisting of: $CO_2$, $N_2$, Ar, He, Ne, Kr, $H_2O$, $O_2$ and Xe.

8. The feedstock material of claim 1, wherein a coefficient of thermal expansion for the MOF ranges from −50 to 50 ppm $K^{-1}$.

9. A method of manufacturing comprising:
   selecting a first material, wherein the first material has a positive coefficient of thermal expansion; and
   selecting a metal organic framework (MOF), wherein the MOF comprises a plurality of nodes and a plurality of linkers, the plurality of nodes coupled to the plurality of linkers, thereby forming a framework, wherein a coefficient of thermal expansion for the MOF is less than the positive coefficient of thermal expansion of the first material;
   combining the first material and the MOF to form a feedstock material; and
   forming a three-dimensional object through use of the feedstock material;
   wherein a ratio of the first material to the MOF by weight ranges from 0.5:0.5 to 0.995:0.005;
   wherein the feedstock material is a composite material;
   wherein, the coefficient of thermal expansion for the MOF is 10% to 25% lower than the coefficient of thermal expansion for the first material.

10. The method of claim 9, wherein the feedstock material has a coefficient of thermal expansion ranging from 0.1 to 200 ppm $K^{-1}$ less than the coefficient of thermal expansion of the first material.

11. The method of claim 9, wherein forming the three-dimensional object through use of the feedstock material is performed layer-by-layer.

* * * * *